United States Patent
Da Igreja

(10) Patent No.: US 10,544,936 B1
(45) Date of Patent: Jan. 28, 2020

(54) THERMOCHEMICAL TREATMENT SYSTEM FOR PLASTIC AND/OR ELASTOMERIC WASTE

(71) Applicant: Hélio Da Igreja, Toledo (BR)

(72) Inventor: Hélio Da Igreja, Toledo (BR)

(*) Notice: Subject to any disclaimer, the term of this patent is extended or adjusted under 35 U.S.C. 154(b) by 0 days.

(21) Appl. No.: 16/209,281

(22) Filed: Dec. 4, 2018

(51) Int. Cl.
| | |
|---|---|
| *B29B 17/02* | (2006.01) |
| *C08J 11/12* | (2006.01) |
| *C10B 53/07* | (2006.01) |
| *C10B 3/02* | (2006.01) |
| *C10G 9/40* | (2006.01) |

(Continued)

(52) U.S. Cl.
CPC .......... *F23G 5/0276* (2013.01); *B09B 3/0016* (2013.01); *B09B 3/0083* (2013.01); *B29B 17/02* (2013.01); *C08J 11/12* (2013.01); *C10B 53/07* (2013.01); *B29B 2017/0255* (2013.01)

(58) Field of Classification Search
CPC ... F23G 5/0273; B09B 3/0016; B09B 3/0083; B29B 17/02; C08J 11/12; C10B 53/07; C10B 3/02; C10G 9/34; C10G 9/40
USPC ...................................................... 422/184.1
See application file for complete search history.

(56) References Cited

U.S. PATENT DOCUMENTS

| | | | | |
|---|---|---|---|---|
| 5,319,176 A | * | 6/1994 | Alvi | A62D 3/19 110/236 |
| 5,534,659 A | * | 7/1996 | Springer | B01J 6/008 110/346 |

(Continued)

FOREIGN PATENT DOCUMENTS

| | | |
|---|---|---|
| BR | 0307553 A | 1/2005 |
| CN | 203764635 U | 8/2014 |

(Continued)

OTHER PUBLICATIONS

V. Belgiorno et al. "Energy from gasification of solid wastes," Waste Management, Jan. 2003, pp. 1-15, v. 23, n. 1.

(Continued)

*Primary Examiner* — Huy Tram Nguyen
(74) *Attorney, Agent, or Firm* — Pilloff Passino & Cosenza LLP; Sean A. Passino; Rachel K. Pilloff

(57) ABSTRACT

A thermochemical treatment system for plastic and/or elastomeric waste is described, having three Reaction Units (1), (2) and (3) connected in series, being performed in each Reaction Unit, under positive pressure and low temperature (between 200° C. and 660° C.), one step of the thermochemical treatment process of the plastic and/or elastomeric waste without pretreatment (grinding, washing and drying), through the indirect heating by molten salt coils (5), with the generation of a solid fraction which is continuously drained by an outlet (104); a gas fraction which is treated in a Gas Scrubbing Unit (10) for release into the atmosphere, and a liquid fraction (molten plastic) which is subjected to an endothermic reaction under positive pressure (between 2 and 10 bar) and at temperature above 300° C., which generates a gas fraction that is fed into a Heat Exchanger (13), wherein the condensable gases are converted into fractionated combustible liquids of carbon chains from 5 to 35, and the non-condensable combustible gases are reused for heating the system modules, with the excess heat constituting a thermal battery.

9 Claims, 10 Drawing Sheets

(51) Int. Cl.
*F23G 5/027* (2006.01)
*B09B 3/00* (2006.01)

(56) References Cited

U.S. PATENT DOCUMENTS

| | | | | |
|---|---|---|---|---|
| 2006/0163053 | A1* | 7/2006 | Ershag | C10B 47/16 201/13 |
| 2014/0339346 | A1* | 11/2014 | Koenig | B02C 23/02 241/101.5 |
| 2015/0184079 | A1 | 7/2015 | Riedewald | |
| 2017/0009141 | A1 | 1/2017 | Datta et al. | |
| 2017/0283714 | A1* | 10/2017 | Combs | C10G 55/06 |

FOREIGN PATENT DOCUMENTS

| | | |
|---|---|---|
| CN | 105400528 A | 3/2016 |
| WO | 2014008995 A1 | 1/2014 |

OTHER PUBLICATIONS

Stantec Consulting LTD., "Waste to Energy: A Technical Review of Municipal Solid Waste Thermal Treatment Practices—Final Report," Mar. 2011, Burnaby, BC.

Prabir Basu, "Biomass Gasification and Pyrolysis: Practical Design and Theory," Jun. 2010, Elsevier Inc.

Dezhen Chen et al., "Pyrolysis technologies for municipal solid waste: A review," Waste Management, Sep. 2014, pp. 2,466-2,486, vol. 34, issue 12.

Younes Chhiti et al., "Thermal Conversion of Biomass, Pyrolysis and Gasification: A Review," The International Journal of Engineering and Science (IJES), Jan. 2013, pp. 75-85, vol. 2, issue 3.

* cited by examiner

THERMOCHEMICAL TREATMENT SYSTEM FOR PLASTIC AND/OR ELASTOMERIC WASTE

FIELD OF THE INVENTION

The present patent describes a thermochemical treatment system for plastic and/or elastomeric waste which has three Reaction Units connected in series, and in each Reaction Unit one step of the thermochemical process is carried out under positive pressure and low temperature (between 200° C. and 660° C.) upon indirect heating by coils which conduct molten salt through the mass to be pyrolysed, which does not require pretreatment (grinding, washing and drying) and addition of a catalyst, such system, having a module for washing and treating the gaseous fraction which it neutralizes, makes inert and deodorizes for release into the atmosphere; a mechanism that provides the continuous withdrawal of the solid fraction and a heat exchange unit in which the condensable gases are converted into fractionated combustible liquids with carbon chains from 5 to 35, and the non-condensable combustible gases are reused for heating the modules of the system, with the excess heat constituting a thermal battery.

BACKGROUND OF THE INVENTION

The thermochemical treatment promotes the transformation of their chemical structure under high temperatures. The three main thermochemical treatment processes are combustion, gasification and pyrolysis, which have different operations and consequently generate different products (BELGIORNO, V. et al. Energy from gasification of solid wastes. Waste Management, v. 23, n. 1, p. 1-15, 2003. ISSN 0956-053X.).

The thermochemical processes applied to solid waste have several advantages, such as the reduction of the waste volume generated and the ensuing decrease in the demand for disposal areas; the utilization of the energetic potential of the waste; recovery of chemical compounds and minerals that can be reused for other purposes, and the elimination of some contaminants that may be present in the waste (Stantec Consulting Ltd., WASTE TO ENERGY: A Technical Review of Municipal Solid Waste Thermal Treatment Practices—Final Report. Burnaby, B C, 2011).

Specifically, regarding pyrolysis, object of the present patent of invention, it constitutes a process of heating a fuel (in this case, solid waste) at a given heating rate, in complete absence of oxygen (or in an amount so small that it does not allow gasification to occur), and it may or may not be performed in the presence of a mediating gas, such as nitrogen (BASU, Prabir Biomass Gasification and Pyrolysis: Practical Design and Theory, Burlington: Ed. Elsevier, 2010).

The products of pyrolysis, according to Basu (BASU, Prabir. Biomass Gasification and Pyrolysis: Practical Design and Theory. Burlington: Ed. Elsevier, 2010.), Chen et al. (CHEN, D. et al. Pyrolysis technologies for municipal solid waste: A review. Waste Management, n. 0, 2014, ISSN 0956-053X.) and Chhiti & Kemiha (CHHITI, Y.; KEMIHA, M., Thermal Conversion of Biomass, Pyrolysis and Gasification: A Review. 2013. The International Journal of Engineering And Science, v. 2, n. 3 p. 75-85.), are: a) solid fraction, with generation of coal, which can be used as fuel or in energy production; b) liquid fraction, also called pyrolysis oil, which can be processed into fuels and several chemical products, and c) gas fraction, with the generation of condensable gases, such as $H_2$, $CO_2$, $CO$, and $CH_4$.

The prior art describes pyrolysis plants for the conversion of waste into fuels.

BRPI0307553 describes a process for producing synthesis gas to be used as gaseous fuel or raw material, and an apparatus for its production, and an apparatus for the production of liquid fuel through a self-sustaining process, through which a slurry of carbonaceous material in water, and hydrogen from an internal source are fed into a hydrogenation reactor under conditions whereby methane-rich gases are generated and fed into a pyrolytic vapor reformer under conditions whereby the synthesis gas, consisting of hydrogen and carbon, are generated. A portion of the hydrogen generated through the pyrolytic vapor reformer is fed through a hydrogen purification filter into the hydrogenation reactor, the hydrogen thereby constituting the hydrogen from an internal source. Molten salt coils are used to transfer heat from the hydrogenation reactor, and the Fischer-Tropsch reactor if liquid fuel is produced, to the vapor generator and the pyrolytic vapor reformer.

US2017283714 describes a system which converts waste into fuel, the waste being inserted into a premix chamber where the material is mixed with paraffin to create a slurry. This slurry is then forwarded to the Pyrolysis Chamber, split into a Superior Pre-Melting Chamber and a Lower Pyrolysis Chamber. In one embodiment, the Lower Pyrolysis Chamber uses Molten Salt as a heat transfer medium to achieve high stable temperatures without causing corrosion of the chamber, or requiring high vapor pressure. The slurry is pumped into the inlet at the top of the Upper Pre-Melting Chamber, where it is rapidly heated and a portion of it turns into vapor. The portion that was not vaporized descends to the Lower Pyrolysis Chamber where it is heated and turned into vapor. The portion that was not turned into vapor is removed and sold. The vapor undergoes further processing.

US2017009141 describes a method for producing bio-oil from lignocellulosic biomass. The method employs Molten Salt Pyrolysis for an efficient and low-cost production of such precursor chemicals directly from the total biomass under moderate conditions (400° C., 1 atm). The lignocellulosic biomass, freely available in renewable wood and plant products, undergoes a moderate-temperature heating process in a eutectic mixture of molten salt with or without a catalyst to generate condensable vapor from the bio-oil precursor or platform chemicals. Condensation of the vapor results in a high performance bio-oil, having a broad distribution of relatively pure chemicals or precursors, such as furfural and acetic acid, depending on the molten salt and the catalysts used and other reaction conditions.

CN105400528 describes an apparatus and a method of rice hull pyrolysis comprising a stainless steel pyrolysis reactor provided with a vacuum feeder in the upper part. The plurality of molten salt heaters is vertically disposed inside the apparatus, and the molten salt heaters of each group are densely distributed inside the reactor.

US2015184079 describes a process for the treatment of plastic waste by direct heating in a pyrolysis liquid, molten salt or metal. The pyrolysis system is built in such a way that segregation of the light and heavy materials takes place inside the pyrolysis chamber. Carbon black is segregated from pyrolysis vapors by a cyclone, and fractions of carbon black can be obtained by installing several cyclones in series in order to produce different qualities of carbon black. The suction or driving force required for removing the vapor/upper slag is supplied by the blower.

CN203764635 describes a pyrogenic solid waste decomposition device that uses molten salt in which the mass to be pyrolysed is immersed.

WO2014008995 describes a method of gasification of carbonaceous raw material, in particular, biomass. According to the invention, molten salt is used to cool and/or heat the components of the system used for gasification, i.e. in particular, the gasification reactors and/or pyrolysis gas lines. The document describes an apparatus for the pyrolysis of expanded styrene in a liquefaction treatment system. The equipment consists of 4 equidistant and vertically positioned tubular pyrolysis vessels surrounded by the heat transfer medium, which could be molten salt, and a heat source, disposed horizontally. Styrene must be broken down before entering the system.

The pyrolysis process is used to reprocess waste, and there are industrial plants of continuous and batch processing. However, this is a minimally feasible process, since it requires several stages of preparation of the raw material, including sorting, grinding, washing and drying operations, as well as the addition of a catalyst, requiring intensive labor, high energy expenditure and a set of equipment for carrying out the steps that precede the processing of the raw material, and for loading the material in the reaction unit.

For example, in the cleaning step, normally used to remove most of the organic matter, stones or dirt, metals and other materials harmful to the pyrolysis process, a considerable amount of water is used, as well as equipment for the removal of metals.

Regarding the feeding systems currently used in industrial pyrolysis plants, the ground raw material is conveyed by a screw-worm, which limits the size of the raw material and demands a large amount of energy for its operation. The mechanical components of the screw-worm are susceptible to damage caused by friction between the raw material and the thread wedges and, additionally, a pressure increase in the vessel being fed leads to a decrease in the flow of raw material and to higher work requirements from the motor, so that pressure peaks can cause damage to the motor and the entire feeding system.

Moreover, despite the pretreatment, many impurities are drawn into the system modules, and the process needs to be interrupted for the removal of undesirable solids, which usually happens at the end of the process. However, impurities along the line impact the efficiency of the process, reducing the heat transfer rate to the system, the reaction volume in the tanks and, consequently, the yield and quality of the final product.

Other drawbacks of the thermochemical systems of prior art are related to the homogenization of the raw material, which utilizes propellers, blades, or rotating tanks which, however, should be avoided due to the corrosive atmosphere and elevated temperatures.

Regarding the means of heating, pyrolysis systems usually have electrical resistances, inductors or direct flame burners. The first two imply a high production cost, requiring its own power plant due to the high demand of electric energy, and the direct flame burners offer poor temperature control, and have a risk of explosion if the flame comes in contact with the product. Another problem in the use of both electric and direct burning systems is energy reuse, since in these configurations there is no efficient way to reuse the energy, making the process even more expensive and thus minimally feasible.

Finally, the continuous pyrolysis systems described in the prior art generally employ a single reactor for the pyrolytic reactions, normally fed by screw-worms directly into the reaction tank, so that the stops for loading and performing maintenance on the feeder interrupt production. Furthermore, most of the pyrolytic processes of the prior art do not use a pressurized environment to develop the reaction, which directly influences the quality of the final product and the process yield, besides the fact that they need a previous stage of pretreatment of the residue.

Thus, in order to provide an economically feasible and environmentally safe system, the object of the present patent of invention is a thermochemical treatment system for plastic and/or elastomeric waste in which the thermochemical treatment steps are carried out in a set of three reactors connected in series, increasing the safety and control of the process, with the pyrolysis step being carried out under conditions of positive pressure and temperature above 300° C., upon indirect heating by coils which conduct molten salt through the mass to be pyrolysed, and which includes the separation of gases and liquids, continuous removal of the solid fraction, and elimination of the previous treatment step of the plastic and/or elastomeric material.

SUMMARY

A thermochemical treatment system for plastic and/or elastomeric waste is described, which has three reaction units connected in series, and in each reaction unit a thermochemical process step is carried out, guaranteeing a continuous production process under positive pressure and low temperature (between 200° C. and 660° C.).

A thermochemical treatment system for plastic and/or elastomeric waste is described which does not require the raw material pretreatment step, and thus eliminates the conventional sorting, cleaning, and grinding operations and, consequently, the expenses related to the time needed to process the raw material, energy consumption and water.

A thermochemical treatment system for plastic and/or elastomeric waste is described, the feed of which is fed by an admission module devoid of moving parts and low energy consumption, admitting a single charge with a volume of up to 2 m3, without the need grinding, drying and cleaning.

A thermochemical treatment system for plastic and/or elastomeric waste is described which provides the continuous removal of the undesired solid fraction from the first reaction unit, avoiding equipment damage and clogging of the piping and the need to shutdown the process.

A thermochemical treatment system for plastic and/or elastomeric waste is described which provides the elimination of gaseous impurities by treatment in a gas washing and treatment module for the release of the purified, inert and deodorized gases into the atmosphere.

A thermochemical treatment system for plastic and/or elastomeric waste is described which uses molten salt for the transfer and supply of thermal energy for the process of pyrolysis and storage of the excess thermal energy produced, said molten salt being inert and non-hazardous to the environment in case of leakage, stable at high temperatures, even in the presence of oxygen, non-flammable and having a high specific heat in the liquid phase, an important condition for the transfer/storage of energy, as well as for the stability of the temperatures required by the process.

A thermochemical treatment system for plastic and/or elastomeric waste is described which has a raw material intake module with a zone of inertization that prevents the formation of organochlorine compounds, such as dioxins and furans, in the first Reaction Unit.

A thermochemical treatment system for plastic and/or elastomeric waste is described, having a raw material intake module at negative pressure, so that any gases that might escape from the First Reaction Unit during the feeding process do not come in contact with the external environment, ensuring the safety of workers and the process.

A thermochemical treatment system for plastic and/or elastomeric waste is described, which neutralizes, makes inert, and deodorizes the volatile fraction generated in the First Reaction Unit, where the plastic and/or elastomeric waste is melted, eliminating the need for burning, and releasing only purified gases to the atmosphere.

A thermochemical treatment system for plastic and/or elastomeric waste is described, which has in the first Reaction Unit a recirculation system for the already molten raw material that has the purpose of homogenizing the mixture, accelerating the liquefaction process and filtration of the molten mass.

A thermochemical treatment system for plastic and/or elastomeric waste is described, which has a second Reaction Unit that stores the liquid fraction and keeps it heated to be transferred to the Reaction Unit where the pyrolysis process will be carried out, in said second Reaction Unit being altered the process from batch mode to continuous, guaranteeing better performance and agility of the operations.

A thermochemical treatment system for plastic and/or elastomeric waste is described, which has a second Reaction Unit that possess a safety margin in case of quick stops of the First Reaction Unit, without affecting the continuous production in the third Reaction Unit, and also allows controlling the flow of material that is sent to this Third Unit.

A thermochemical treatment system for plastic and/or elastomeric waste is described, which has a redundant safety system in the three Reaction Units, in which the thermal energy stored inside the units is discharged into tanks with liquids in order to absorb this energy in case of an emergency shutdown, in addition to the abundant injection of inert gases, ensuring a temperature drop and control of the environment without the presence of oxygen until the system is stabilized.

DETAILED DESCRIPTION OF THE INVENTION

For the purposes of the present patent of invention, the terms "raw material" or "waste" are used to refer to plastic (thermoplastic and/or thermosetting) or elastomeric waste, which may contain portions of waste of other types (for example, metals, sand, wood, paper, glass, organic matter) without harming the reaction processes.

The thermochemical treatment system for plastic and/or elastomeric waste, object of the present patent of invention, comprises a set of three Reaction Units (1), (2), and (3), connected in series, provided with indirect heating, reaching temperature between 200° C. and 660° C. and operating under positive pressure conditions.

In each Reaction Unit (1), (2) and (3), one step of the thermochemical process of the plastic and/or elastomeric waste is carried out, being obtained a solid fraction, a gas fraction and a fractionated liquid fraction, the latter being of interest in the context of the present invention due to the fact that it has high energy density and can be used as a substitute for petroleum products with C5 to C35 carbon chains.

The thermochemical treatment system for plastic waste is fully automated, provided with a Control Unit (4) with a programmable microprocessor connected to a microcomputer, where the process controls and parameters are stored, said Control Unit (4) being responsible for driving the motors, pumps and valves based on the signals received from sensor elements.

Figure 1A:
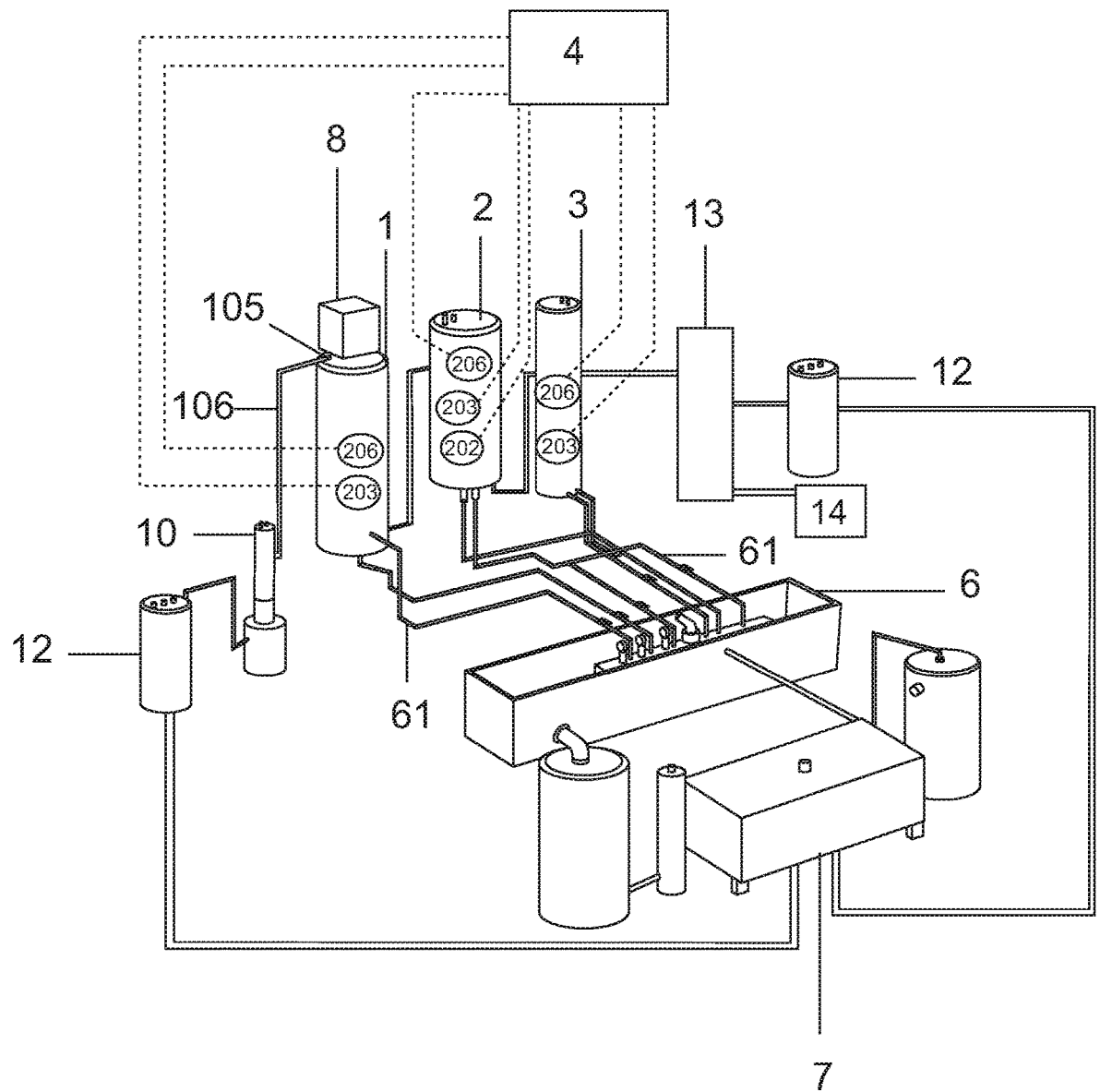
FIG. 1A shows the representation of the thermochemical treatment system of plastic waste (we have to show T2)
Figure 1B:
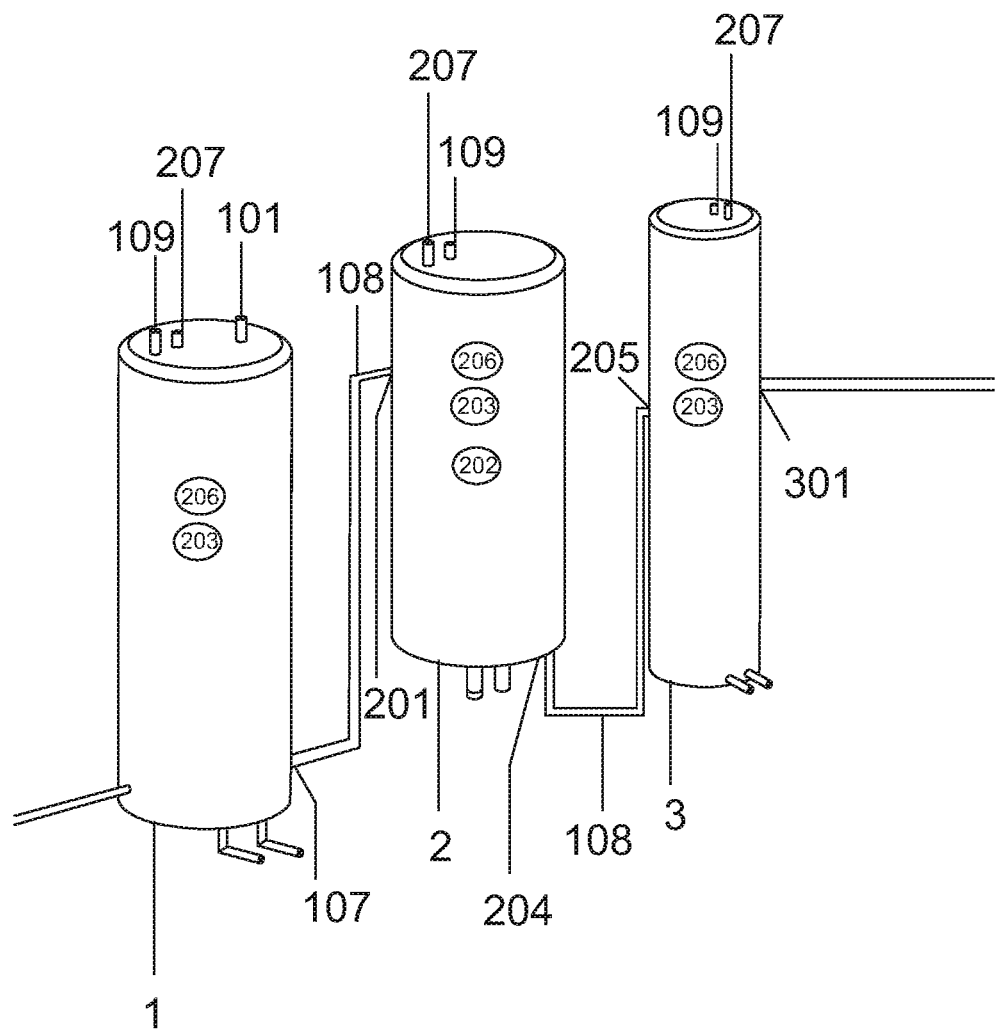
FIG. 1B shows details of the Reaction Units.
Figure 2:
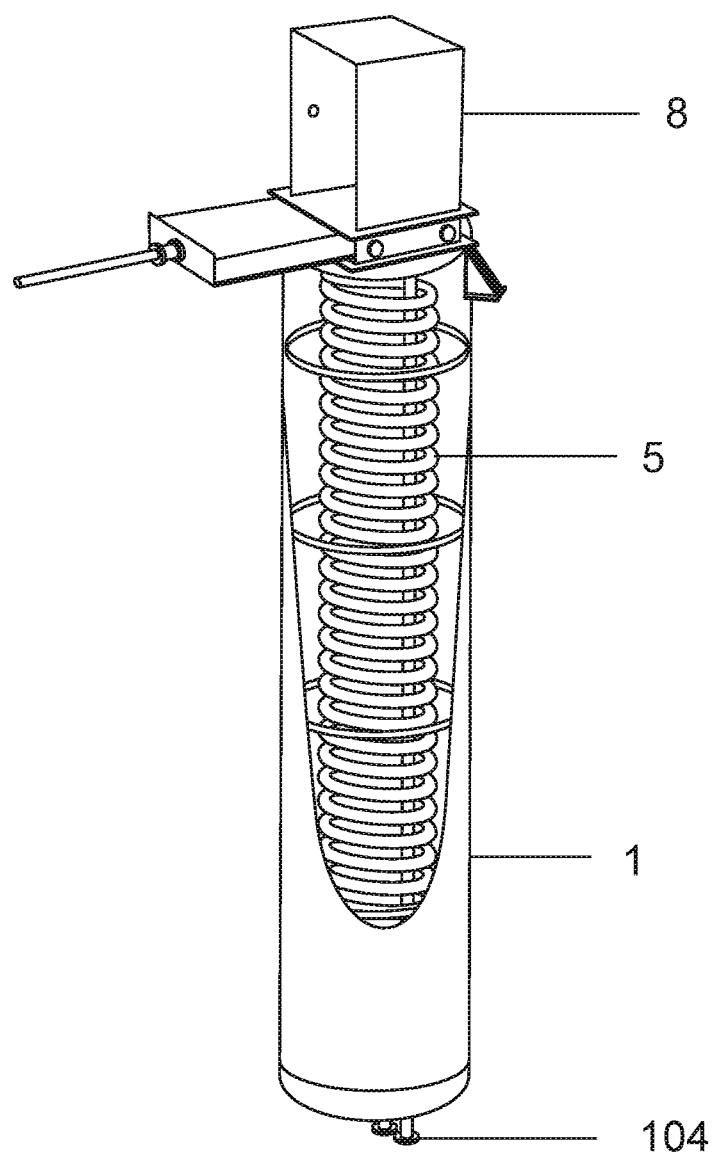
FIG. 2 shows a reaction unit, in this case the First Reaction Unit ($U_{r1}$), depicting the molten salt coil juxtaposed to the inner walls, with the outlets in the lower portion for the inflow and outflow of the molten salt.

As shown in FIG. 2, the Reaction Units (1), (2) and (3) have an internal region provided with molten salt coils (5), whose temperature is monitored by the Control Unit (4) through temperature sensors (11) having at the base of the reaction units (1), (2) and (3) a valve-controlled opening for connecting the inlet and outlet lines of molten salt (61).

The molten salt circulating in the coils (5) is stored in a tank (6) heated by the heat generated in the Combustion Unit (7) which is fed with the excess gas (non-condensable combustible gases) generated in the system, which will be detailed below, said molten salt circulates in the coils (5) and returns to the tank (6) through lines (61) upon the action of a pump (not shown).

Figure 3:
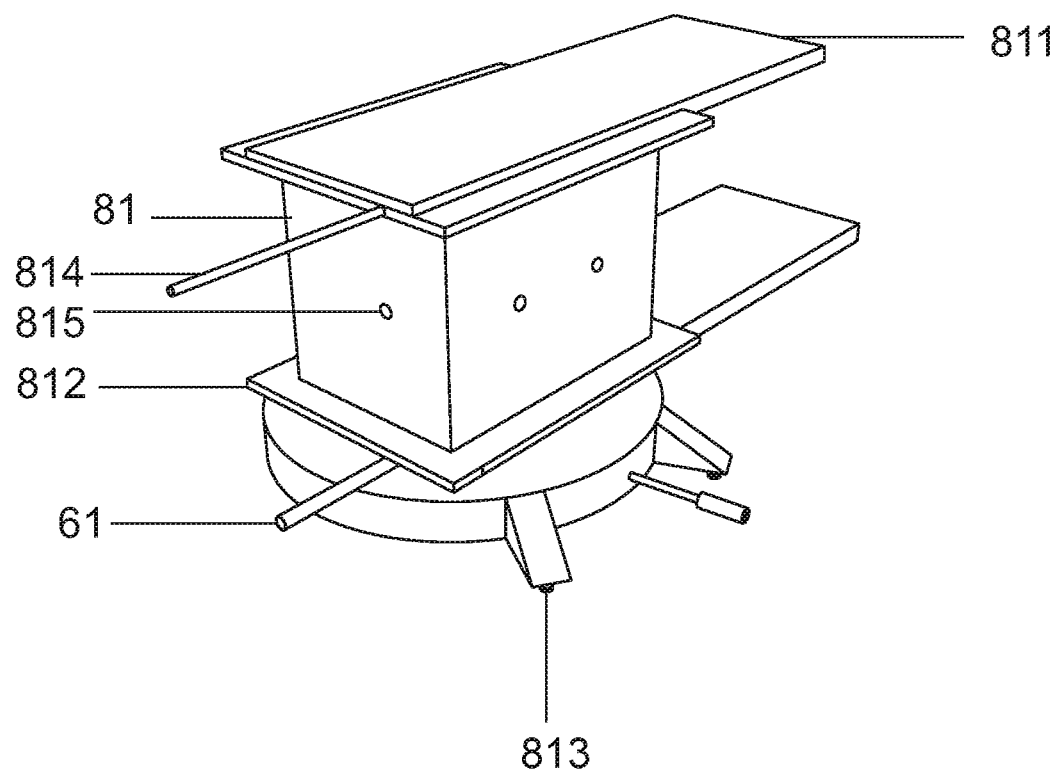
FIG. 3 shows a cross-sectional view depicting the Raw Material Intake Module ($M_{mp}$).

As shown in FIG. 3, the Raw Material Intake Module (8) comprises a chamber provided with physical means for disposing the waste into an inertization zone (81), closed at the top by a valve actuated lid (811) and closed at the bottom by a second lid actuated by a valve (812), and which includes a level sensor (813) that sends data to the Control Unit (4) for the activation of said valves (811) and (812), and of a valve (814) that allows the inflow of the inert agent, preferably Nitrogen, for the operation of inertization of the waste.

Preferably, the Raw Material Intake Module (8) is positioned in the upper portion of the First Reaction Unit (1), and is capable of receiving volumes of up to 2 m³ on each loading of the feed valve.

During the raw material intake operation, the bottom lid of the inertization chamber (81) is kept closed, and waste is accumulated until the maximum volume is reached, detected by the level sensor (813), which sends a signal to the Control Unit (4), which actuates the valve (811), which promotes the closure of the top lid of said inertization chamber (81). Afterwards, the Control Unit (4) actuates the valve (814) which allows the inflow of a pre-defined volume of an inert gas, such as Nitrogen, into the inertization zone (81) until an oxygen sensor (815) detects a low level of oxygen, at values previously defined in the Control Unit (4), signaling to the Control Unit (4) the conclusion of the inertization of the raw material deposited in said chamber (81), followed by the opening of the bottom lid, by the activation of valve 812, in order to drain by gravity the plastic waste in an inert environment into the First Reaction Unit (1).

The inertization chamber (81), at negative pressure, prevents any gas leakage from the First Reaction Unit (1), which might have occurred during the raw material intake operation, to be released into the atmosphere, thus ensuring the safety of the process and of the workers involved in the operation.

The First Reaction Unit (1) has a valve-controlled inlet (101), in the upper portion, for the inflow of the inert residue flowing from the Raw Material Intake Module (8).

In this First Reaction Unit (1), the waste is melted through indirect heating by the coils (5), generating a liquid fraction (molten plastic), a solid fraction (waste that do not melt at the process temperature, such as metals and minerals) and a gaseous fraction (gases generated in the melting process); in said First Reaction Unit (1), being extracted hydrogen and oxygen at low temperature, avoiding the formation of possible dioxins/furans in the subsequent steps; the homogenization of the raw material during the recirculation process, an important condition for the stability of the process in the pyrolytic phase and the filtration of this raw material.

Figure 4A:
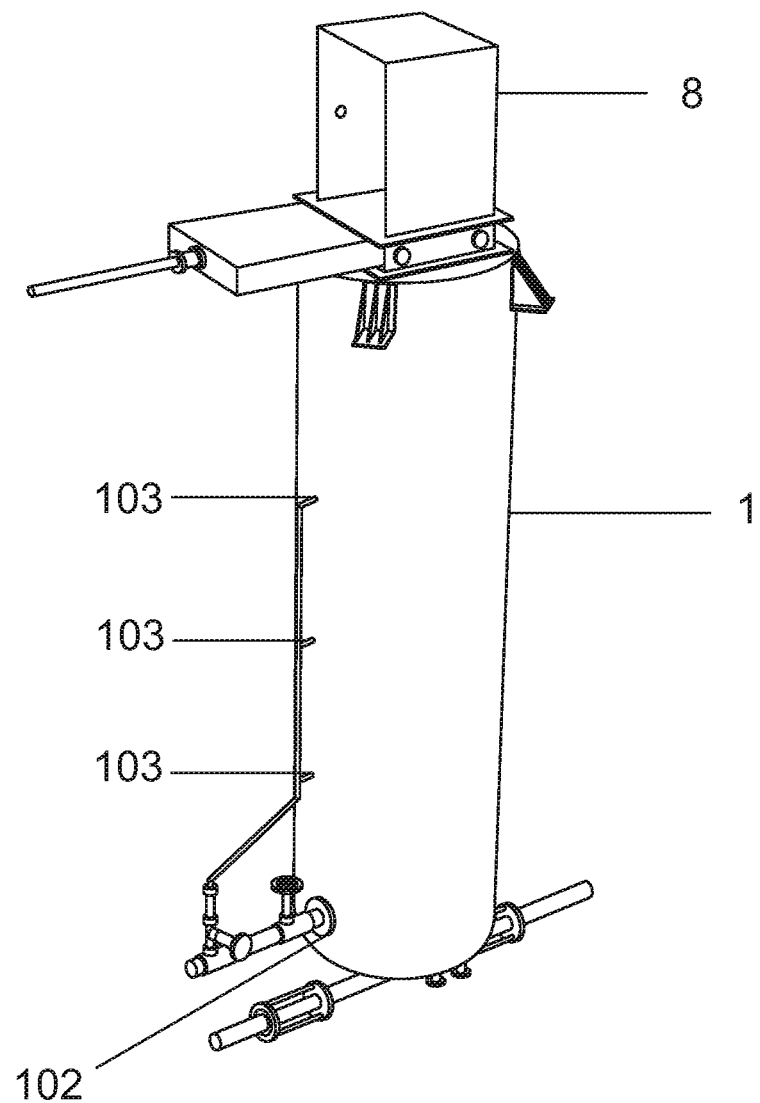
FIG. 4A shows the First Reaction Unit ($U_{r1}$) depicting the recirculation circuit (we have to show s1, e2) (e1, s3, 12, s4, 13, e8, s8).

The First Reactor Unit (1) is provided with a liquid fraction recirculation and filtration circuit, as shown in FIG. 4A, which promotes the continuous homogenization and filtration of the raw material, an outlet controlled by a valve (102) being provided at the base of the Reaction Unit (1) through which a determined volume of molten material is extracted, in proportion to the valve opening time previously programmed in the Control Unit (4), and reintroduced in the First Reaction Unit (1) by inlets (103) arranged at various heights, thus guaranteeing the homogenization of the content and temperature, by the action of a pump (not shown).

Figure 4B:
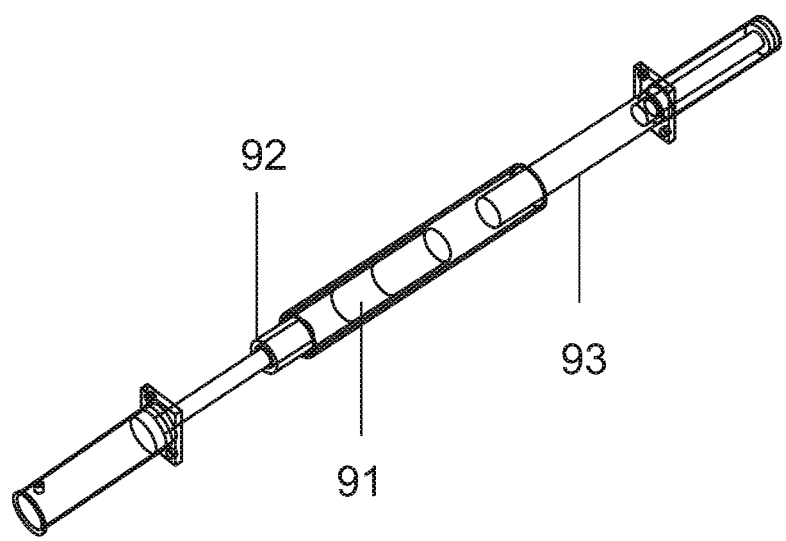
FIG. 4B shows in detail the mechanism of release of the solid fraction of the First Reaction Unit ($U_{r1}$)
Figure 4C:
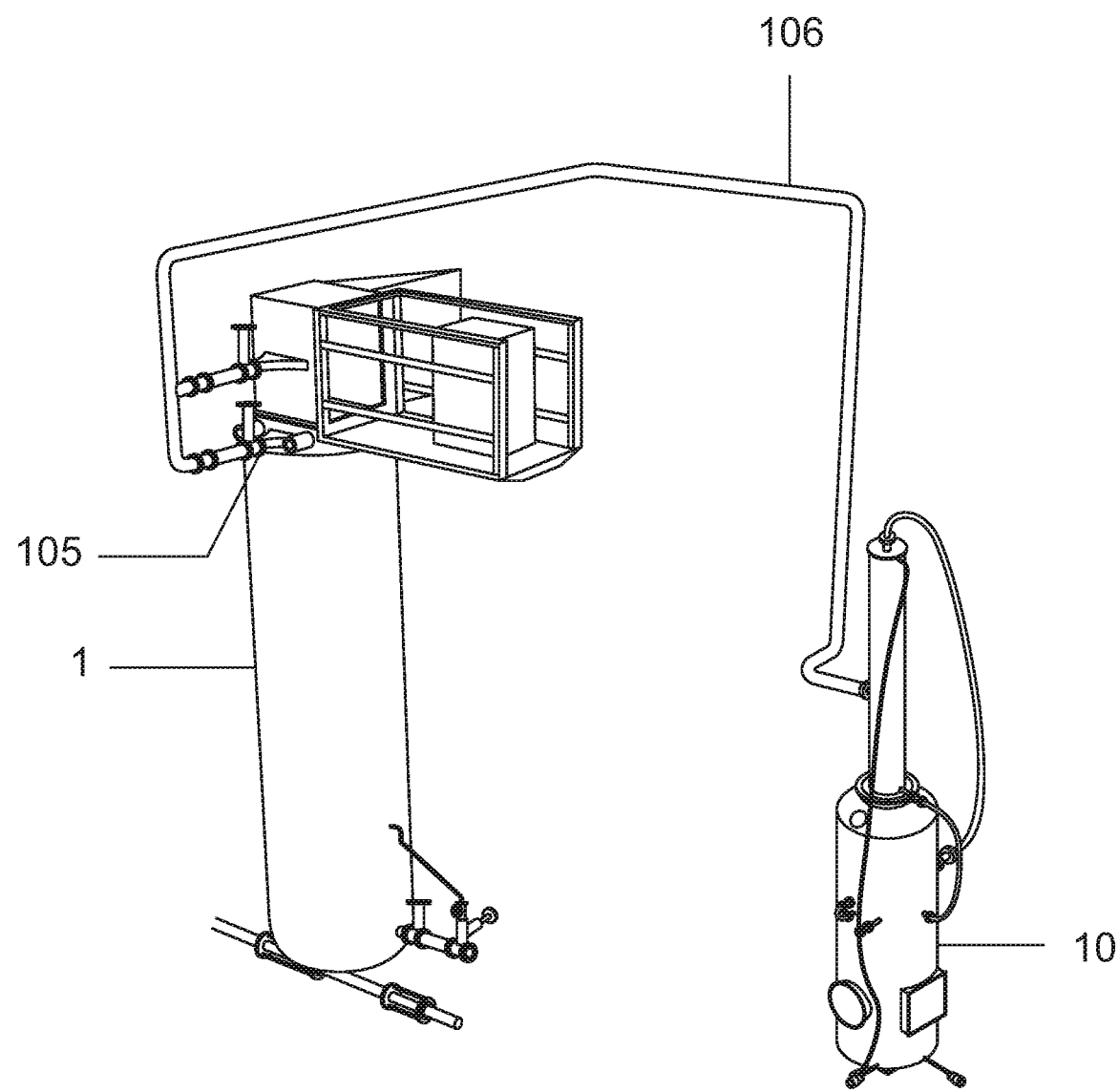
FIG. 4C shows a gas scrubber unit coupled to the First Reaction Unit.

At the base of the first Reaction Unit (1) an outlet (104) is provided for draining the solid fraction, at said outlet (104), being provided a mechanism having a first hydraulic piston (91), controlled by a pressure sensor (92) which continuously drives said first piston (91) which travels from the outlet (104), allowing the release of the solid fraction which is dragged by a second hydraulic piston (93) to a discharge point as shown in FIG. 4B.

In the upper portion of the First Reactor Unit (1) a valve-controlled outlet (105) is provided, to which is connected a line (106) that directs the gas fraction into a Gas Scrubbing Unit (10), which exhausts the gases contained in the First Reaction Unit (1) due to the pressure drop generated by the cooling of the gases in said Gas Scrubbing Unit (10), thereafter, the volatile fraction being directed into a Bubbling Fluidized Bed Reactor (12) for the release of the gas fraction to the atmosphere.

The liquid fraction stored in the First Reaction Unit (1) is transferred to the Second Reaction Unit (2) through a valve-controlled outlet (107) to which is coupled a line (108) that directs said liquid fraction with the use of a pump (not shown) to an inlet (201) arranged in the Second Reaction Unit (2).

In the Second Reaction Unit (2), also called the reservoir or buffer tank, the liquid fraction released from the First Reaction Unit (1) is stored and heated by the coils of molten salt (5) until a certain volume is reached, so that the level control sensor (202) identifies that the maximum capacity of said Second Reaction Unit (2) has been reached, and sends a signal to the Control Unit (4) which activates the closing valve of the inlet (201), interrupting the flow of the liquid fraction coming from the First Reaction Unit (1).

Figure 6:
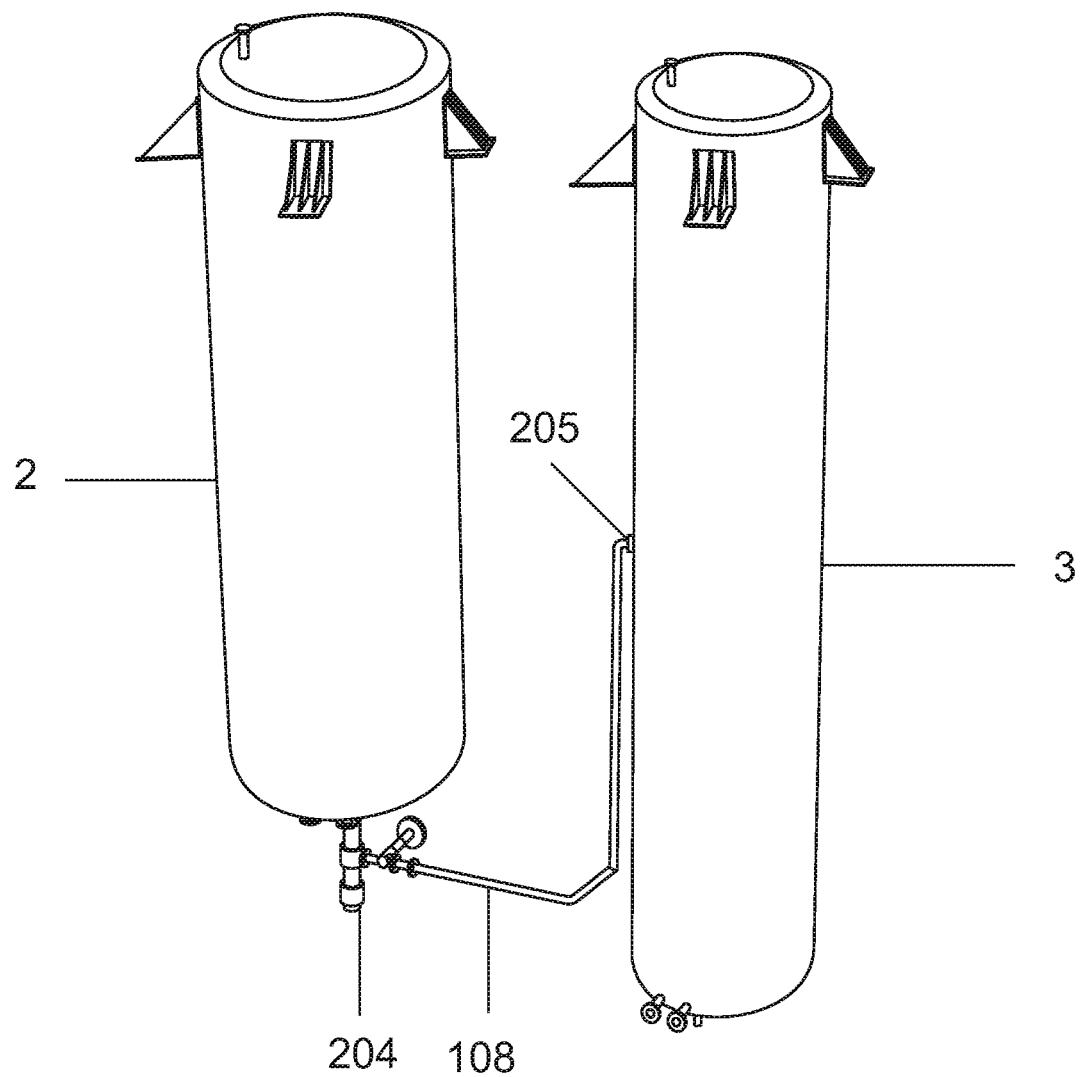
FIG. 6 shows details of the Second Reaction Unit ($U_{r2}$) and the Third Reaction Unit ($U_{r3}$).

As shown in FIG. 6, a temperature sensor (203) sends internal temperature data from the Second Reaction Unit (2), and when the liquid fraction temperature reaches the value previously defined in the Control Unit (4), the output (204) valve is activated, which allows the transfer of the liquid fraction from the second Reaction Unit (2) to the Third Reaction Unit (3) through a feed line (108) driven by the activation of a pump (not shown).

The liquid fraction enters the Third Reaction Unit (3) through a valve-controlled inlet (205), said inlet (205) is positioned at the midpoint of the Third Reaction Unit (3) in order to avoid the loss of the pyrolysed gas load, accelerate the pyrolysis process and promote the dragging of possible heavier gas molecules, reintroducing them in the pyrolysis process.

Figure 7:
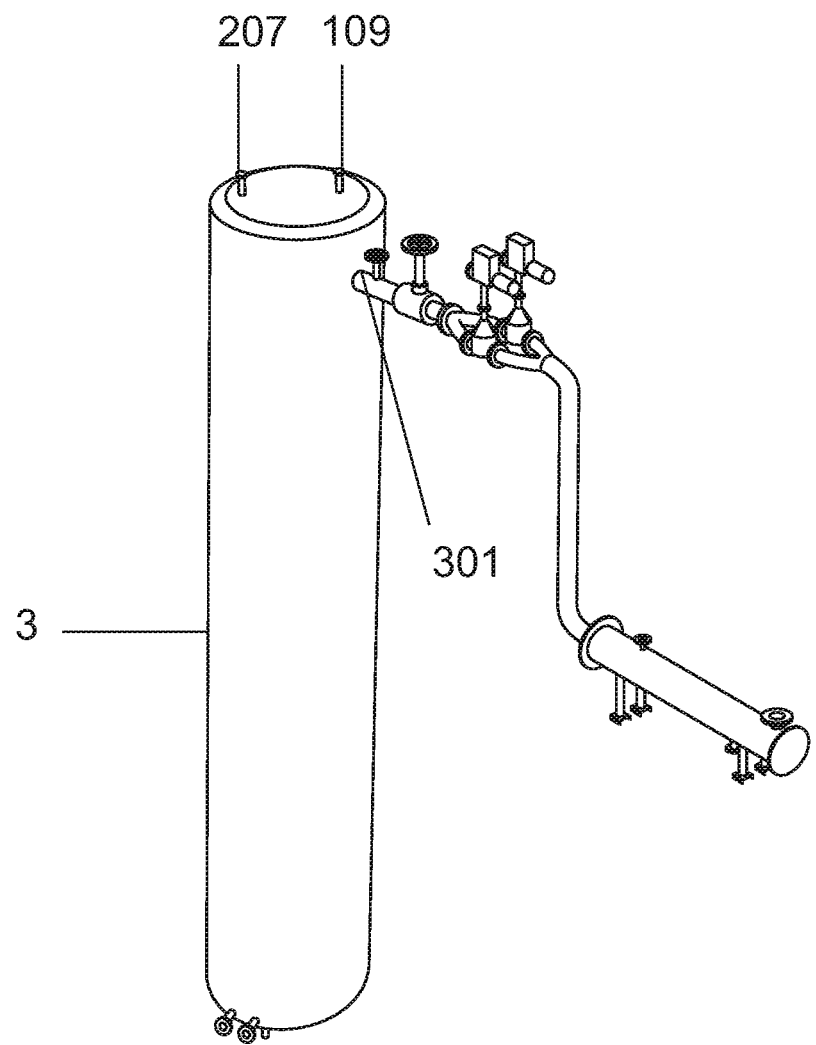
FIG. 7 shows details of the Third Reaction Unit ($U_{r3}$).

In the Third Reaction Unit (3) the liquid fraction is subjected to an endothermic reaction under positive pressure (between 2 and 10 bar) and at a temperature above 300° C., with thermal cracking occurring in the absence of oxygen upon the injection of an inert gas such as Nitrogen, with the pressure and temperature parameters controlled by respective pressure (206) and temperature (203) sensors that send signals to the Control Unit (4) for monitoring the process, as shown in FIG. 7.

In this Third Reaction Unit (3), as temperature increases, the volatile components of the plastic waste are vaporized and gaseous products are rapidly formed by the breakdown of covalent bonds and recombination of the resulting products. Thus, the transformation of a significant fraction of the raw materials to the gas phase results in an increase in pressure inside the reactor. On the other hand, the molar volume of the gas that has been introduced to create an inert atmosphere undergoes a pronounced increase with increasing temperature, which also contributes to the increase of pressure (HENRIQUES, André Jorge Agostinho. *Produção de Combustiveis Liquidos por Pirólise de Misturas de Residuos Plásticos e Óleos Vegetais* (free translation: *Production of Liquid Fuels by Pyrolysis of Mixtures of Plastic Waste and Vegetable Oil*). Universidade Nova de Lisboa. (Master Thesis), 2012).

In the Third Reaction Unit (3) a proportional valve-controlled outlet (301) is provided, which controls the internal pressure and allows the controlled outflow of the gas fraction, under the command of the Control Unit (4).

The gas fraction released by the output (301), upon completion of the reaction time programmed in the Control Unit (4), is routed to a Heat Exchanger (13), such as parallel flow or counterflow heat exchangers, for example.

In the Heat Exchanger (13), the gas fraction is cooled by indirect contact with a refrigerant fluid, and therefore the condensable gases are converted into fractionated combustible liquids, which are directed to a storage tank (14).

The non-condensable gases in the Heat Exchanger (13) are directed to a Bubbling Fluidized Bed (12) Reactor which feeds a Combustion Unit (7) that guarantees the heating of the molten salt storage tank (6) and constitutes a thermal battery with the excess heat.

The Gas Scrubbing Unit (10), which receives the gas fraction generated in the First Reaction Unit (1), causes a pressure drop in this First Reaction Unit (1), thus ensuring the transfer of the volatile fraction to said Gas Scrubbing Unit (10) by means of a pressure difference.

Figure 5:
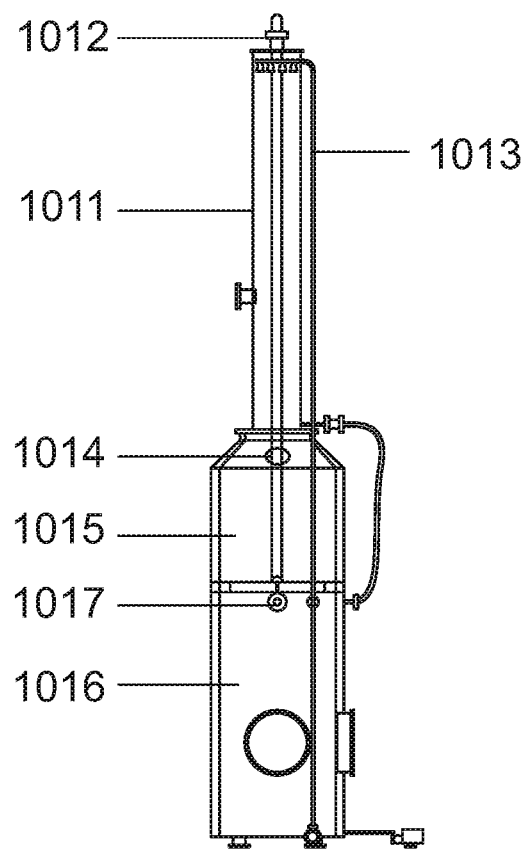
FIG. 5 shows details of the Gas Scrubber Unit ($U_{lav}$).

As shown in FIG. 5, the Gas Scrubbing Unit (10) has an upper chamber (1011) provided with a valve-controlled inlet (1012) which, under command of the Control Unit (4), allows the inflow of the volatile fraction, said upper chamber (1011) being provided with sprinklers which release a mist of neutralizing solution fed by specific piping (1013), in order to cool the gases generated in the First Reaction Unit (1), such as $CO_2$, CO, HCl, HF, $SO_2$, NOx, $H_2S$, $SO_3$, $SO_4$, $NH_3$, $O_2$, $H_2O$, particles, heavy metals, dioxins and furans, and volatile organic compounds. When the treatment time programmed in the Control Unit (4) ends, a valve is activated to open a bottom outlet (1014) for routing the gases to an intermediate chamber (1015) where the gases are neutralized by a chemical solution, afterwards, the gases, already in liquid phase and treated, are directed to a lower chamber (1016) through a valve-controlled opening (1017) where said gases are separated using the chemical solution stored in the upper chamber (1011), being then directed to a Bubbling Fluidized Bed Reactor (12) that has the function of complementing the treatment of any components that might be in disagreement with the environmental regulations before releasing the gas fraction into the atmosphere.

The Gas Scrubbing Unit (10) has sensors in the lower chamber (1016) that identify the type of gas, the data being sent to the Control Unit (4) to control the process and perform any necessary corrections.

The Reaction Units (1), (2) and (3) have, in the upper portion, a valve-controlled inlet (109) for the inflow of an inert gas, such as Nitrogen, for recomposition of the atmosphere inside the tanks (1), (2) and (3) at the moment during which the liquid fraction is transferred between said Reaction Units (1), (2) and (3), or to provide cooling.

The Reaction Units (1), (2) and (3) have in the upper portion a valve-controlled outlet (207) for pressure relief and exhaust of vapors, water and undesirable gases, by means of a pressure difference.

The pumps cited in the scope of the present patent of invention are preferably gear pumps and/or centrifugal pumps, suitable for working in environments with positive pressure, at the temperatures required by the process, with impurities dispersed in the molten mass and having a density of 700 to 1200 kg/m3.

The thermochemical treatment system for plastic and/or elastomeric waste, object of the present patent of invention, has a safety control mechanism comprised by sensors in the three reaction units (1), (2) and (3). The sensors installed in these Reaction Units (1), (2) and (3) send data to the Control Unit (4) which, upon identifying an abnormal situation in the process, based on previously defined variables, triggers a security protocol which includes the activation of the valves that control the inflow of inert gas into each Reaction Unit (1), (2) and (3); the opening of the inlets of the Bubbling Fluidized Bed Reactors (12), so that the gas contained in the First Reaction Unit (1), the Second Reaction Unit (2) and the Third Reaction Unit (3) is expelled from said Reaction Units, burned (oxidized), cooled and treated before being expelled into the atmosphere; and the opening of the valves for emptying the molten salt coils (5), with the flow being driven by gravity into the tank (6).

The volumetric capacity of the Bubbling Fluidized Bed Reactors (12) must allow the storage of the thermal energy volume contained in the form of gases in the First Reaction Unit (1), the Second Reaction Unit (2) and the Third Reaction Unit (3), in case an emergency protocol is triggered.

The invention claimed is:

1. A thermochemical treatment system for plastic and/or elastomeric waste comprising:
   a) a raw material intake Module (8) with an inertization zone (81) provided with an oxygen sensor (815) and a raw material level control sensor (813);
   b) a first reaction unit (1) with an internal region provided with molten salt coils (5), having a valve controlled inlet (101) for gravity flow of the waste, received from the raw material intake module (8), to be melted, generating a solid fraction which flows continuously through an outlet (104), a gas fraction released by a valve controlled outlet (105), and a liquid fraction released by a valve controlled outlet (107);
   c) a second reaction unit (2) with an internal region provided with molten salt coils (5), having a valve controlled inlet (201) to which is connected a line (108) for admission of the liquid fraction released by the outlet (107) of the first reaction unit (1), a level control sensor (202), a temperature sensor (203) and a liquid fraction outlet valve (204);
   d) a third reaction unit (3) having an internal region provided with molten salt coils (5), said third reaction unit (3) receiving the liquid fraction released by the valve (204) of the second reaction unit (2) through an inlet controlled by a valve (205) positioned at a midpoint of the third reaction unit (3), in said third reaction unit (3) being injected an inert gas, under positive pressure and temperature above 300° C., having pressure sensors (206) and temperature sensors (203) and an outlet controlled by a proportional valve (301) for releasing the gas fraction when the reaction time is over;
   e) a heat exchanger (13) which receives the gas fraction released by the valve (301) of the third reaction unit (3) for cooling by indirect contact with a refrigerant for conversion into fractionated combustible liquids which are stored in a tank (14);
   f) a gas washing unit (10) which receives the gas fraction released by the outlet (105) of the first reaction unit (1) through a line (106), said gas washing unit (10) having an upper chamber (1011) with an inlet controlled by a valve (1012) and sprinklers which release a mist of a neutralizing solution which is fed by a pipe (1013), a lower outlet (1014) in the upper chamber (1011), an intermediate chamber (1015) where the gases are neutralized by a chemical solution, and a lower chamber (1016) provided with a valve controlled outlet (1017) which receives the liquid-phase gases from the intermediate chamber (1015) and separates them using the chemical solution stored in the upper chamber (1011);
   g) a bubbling fluidized bed reactor (12) which receives the gas fraction from the gas washing unit (10) and the non-condensable gases in the heat exchanger (13) to feed a combustion unit (7) for heating the molten salt storage tank (6);
   h) a control unit (4) with a programmable microprocessor connected to a microcomputer which receives data from the level control sensors (813) and (202) and from the temperature sensors (203), oxygen sensor (815) which obtains oxygen concentration data, pressure sensors (206).

2. The thermochemical treatment system for plastic and/or elastomeric waste according to claim 1, wherein the first reaction unit (1), the second reaction unit (2) and the third reaction unit (3) have an inlet with a valve (109) in the upper portion for admission of an inert gas and an outlet with a valve (207) in the upper portion for releasing steam, water, and undesirable gases, by a pressure difference.

3. The thermochemical treatment system for plastic and/or elastomeric waste according to claim 1, wherein the inertization zone (81) is closed at the top by a valve-driven lid (811) and closed at the bottom by a second valve-driven lid (812), having a valve (814) for admission of the inerting agent, said valves (811), (812), and (814) are actuated through commands received from the control unit (4).

4. The thermochemical treatment system for plastic and/or elastomeric waste according to claim 1, wherein the level control sensor (202) sends data to the control unit (4) which, in turn, upon identifying that the maximum capacity has been reached, triggers the closing of the inlet valve (201).

5. The thermochemical treatment system for plastic and/or elastomeric waste according to claim 1, wherein the temperature sensor (203) sends internal temperature data from the second reaction unit (2) to the control unit (4) which, upon identifying that the preset temperature has been reached, triggers the opening of the outlet valve (204).

6. The thermochemical treatment system for plastic and/or elastomeric waste according to claim 1, wherein the molten salt circulates in the coils (5) of the reaction units (1), (2), and (3) and returns to the tank (6) through pipes (61) by pumping.

7. The thermochemical treatment system for plastic and/or elastomeric waste according to claim 1, wherein the first reaction unit (1) has a valve-controlled outlet (102) at the base for releasing a certain volume of molten material previously programmed in the control unit (4), which is reintroduced into the first reaction unit (1) through inlets (103) arranged at various heights.

8. The thermochemical treatment system for plastic and/or elastomeric waste according to claim 1, which has at the outlet (104) of the first reaction unit (1) a mechanism provided with a first hydraulic piston (91) controlled by a pressure sensor (92) that continuously drives said first piston (91) which moves away from the outlet (104), releasing the solid fraction that is pushed by a second hydraulic piston (93) to a point of discharge.

9. The thermochemical treatment system for plastic and/or elastomeric waste according to claim 1, wherein the control unit (4), based on the data obtained by the sensors (202), (203), and (206) installed in the reaction units (1), (2), and (3), identifies an abnormal situation based on predefined variables, initiating a safety protocol that includes the actuation of the valves (109) that control the inerting gas inlets in each reaction unit (1), (2), and (3); the opening of the bubbling fluidized bed reactors inlets (12) to release the gas contained in the reaction units (1), (2), and (3) and the opening of the valves for emptying the fluid salt coils (5) from each reaction unit (1), (2), and (3) for returning to the tank (6).

\* \* \* \* \*